United States Patent [19]

Rath et al.

[11] Patent Number: 5,039,265

[45] Date of Patent: * Aug. 13, 1991

[54] LIGHTWEIGHT FASTENER

[75] Inventors: Jack Rath; Roland A. Wheeler, both of Los Angeles, Calif.

[73] Assignee: VSI Corporation, Culver City, Calif.

[*] Notice: The portion of the term of this patent subsequent to Apr. 10, 2007 has been disclaimed.

[21] Appl. No.: 486,114

[22] Filed: Feb. 28, 1990

[51] Int. Cl.⁵ .................. F16B 35/00; F16B 37/16; B21D 53/20; B21K 1/44

[52] U.S. Cl. .................................. 411/366; 411/424; 411/436; 10/27 R; 10/86 R; 72/469

[58] Field of Search .............. 411/366, 399, 411, 416, 411/424, 426, 427, 436; 10/10 R, 27 R, 86 F, 86 R, 152 R, 153; 72/88–90, 469

[56] References Cited

U.S. PATENT DOCUMENTS

| | | | |
|---|---|---|---|
| 929,027 | 7/1909 | Schuhmann | 411/436 X |
| 1,764,053 | 6/1930 | Reed et al. | 411/411 X |
| 1,940,617 | 12/1933 | Temple | 411/427 X |
| 2,215,930 | 9/1940 | Mahla | 411/411 X |
| 2,314,390 | 3/1943 | De Vellier | 72/90 |
| 2,340,706 | 2/1944 | Somes | 411/411 X |
| 2,740,136 | 4/1956 | Chiaberta et al. | 72/407 X |
| 2,793,884 | 5/1957 | Jungblut | 411/411 X |
| 2,895,367 | 7/1959 | Nagy | 411/378 |
| 2,985,898 | 5/1961 | Guode | 10/27 R |
| 3,538,739 | 11/1970 | Orlomoski | 72/469 |
| 3,828,422 | 8/1974 | Schmitt | 411/366 X |
| 4,034,586 | 7/1977 | Corrette | 72/88 |
| 4,157,725 | 6/1979 | Stanaitis | 411/147 |
| 4,254,809 | 3/1981 | Schustor | 411/500 X |
| 4,260,005 | 4/1981 | Stencel | 411/416 X |
| 4,326,825 | 4/1982 | Volkmann et al. | 411/424 X |
| 4,842,466 | 6/1989 | Wheeler et al. | 411/366 |
| 4,915,559 | 4/1990 | Wheeler et al. | 411/366 |

Primary Examiner—Rodney M. Lindsey
Assistant Examiner—Jerry Redman
Attorney, Agent, or Firm—Christie, Parker & Hale

[57] ABSTRACT

An aerospace fastener comprises a blot with a roll-formed thread, and a nut with a similar thread having a uniform pitch P. The bolt has a cylindrical shank, a threaded tip and a run-out zone between the shank and tip. The thread root in the run-out follows a smooth S-shaped curve with the concave portion preferably having a radius in the range of from 2P to 2.7P. The run-out extends from 1.4P to 2.3P from the maximum grip plane of the bolt, and preferably extends from 1.6P to 2P from the maximum grip plane. The root of the thread in the run-out lies within an envelope defined by boundaries which take into account the maximum and minimum material conditions of the bolt. The nut has a run-in truncating the crest of the nut thread complementary to the run-out to clear the root of the bolt thread when the nut is assembled on the bolt in the minimum grip condition. This permits the nut to be assembled on the bolt further than in a conventional combination, and shortening of the nut and bolt by at least 1P to save weight.

17 Claims, 6 Drawing Sheets

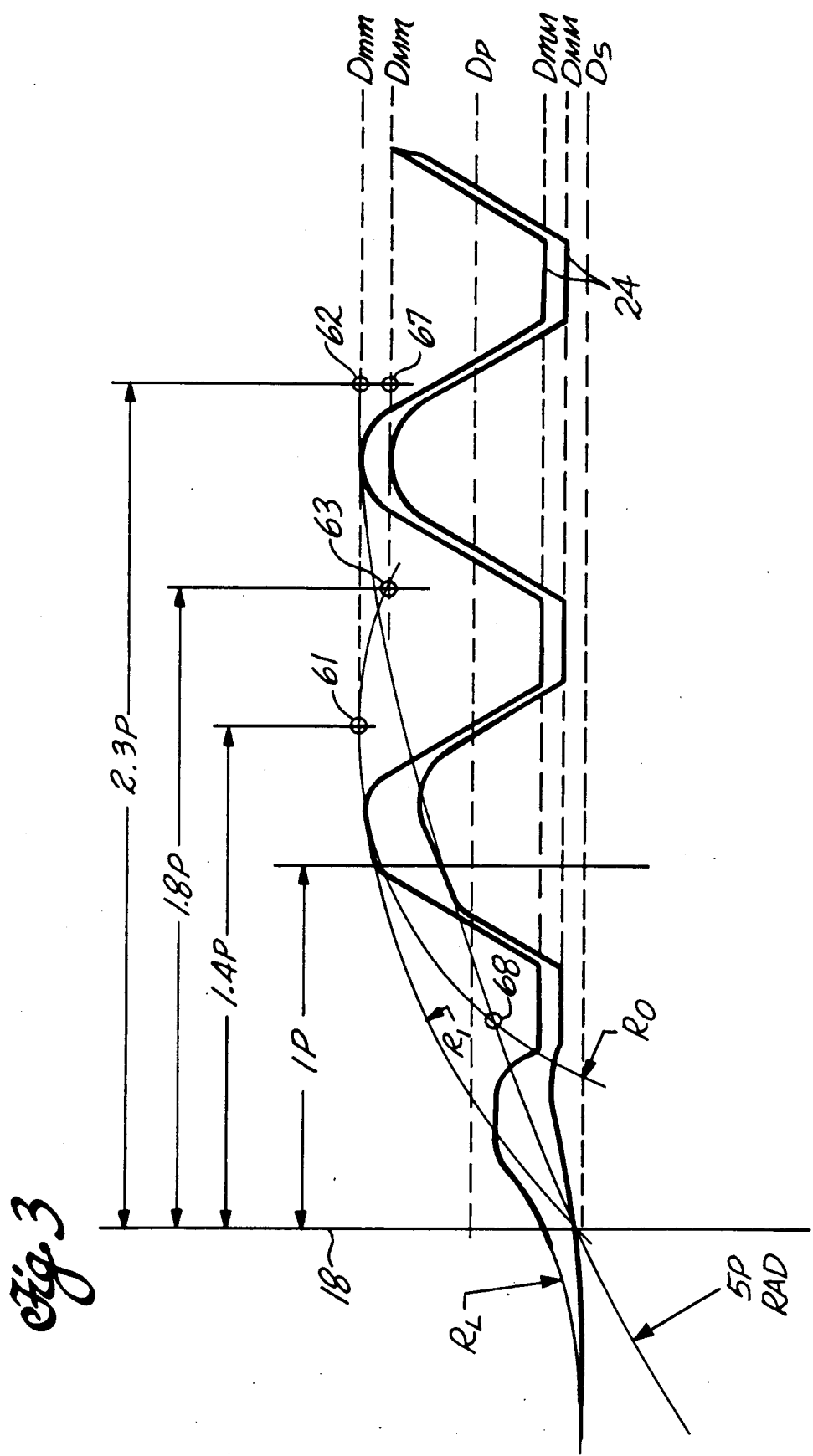

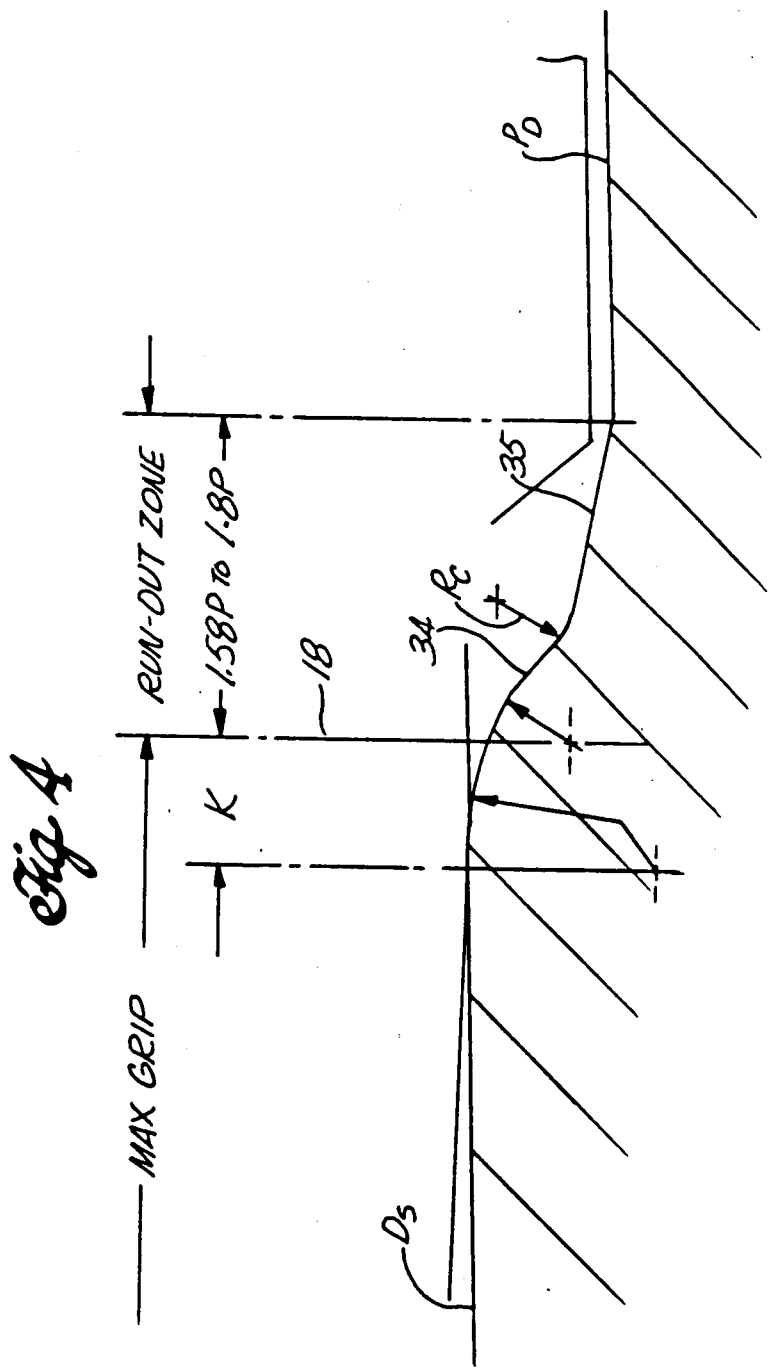

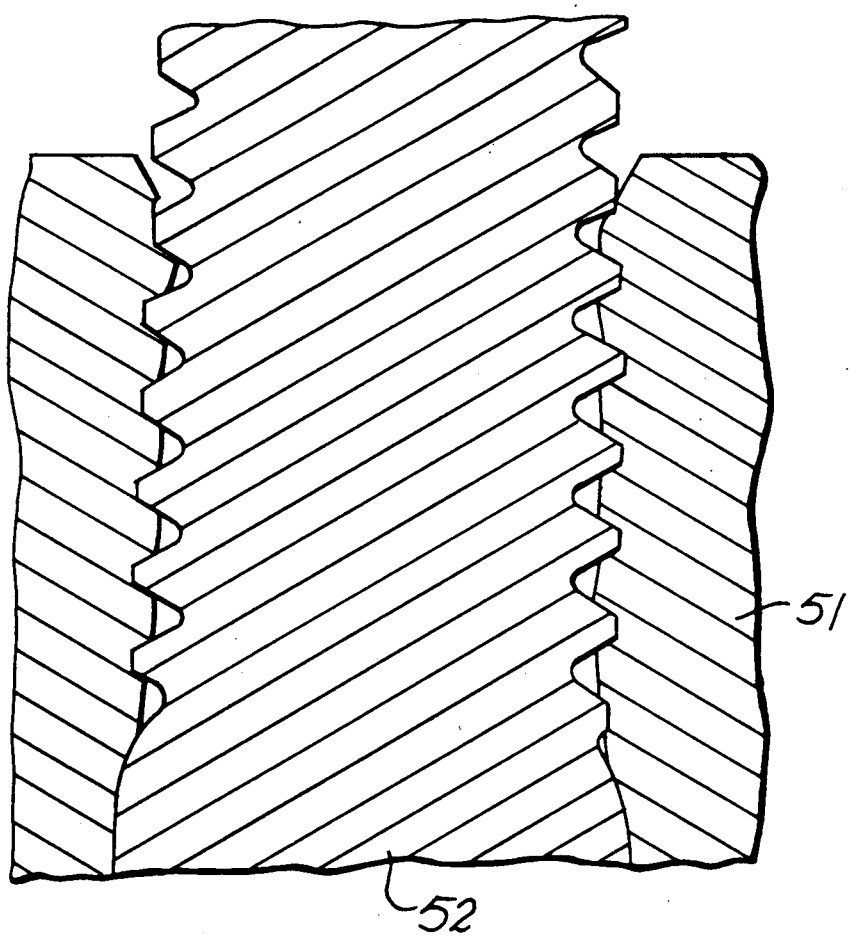

LIGHTWEIGHT FASTENER

CROSS-REFERENCE TO RELATED APPLICATIONS

This application is related to our U.S. Pat. Nos. 4,842,466, filed Apr. 1, 1986, and 4,915,559, filed May 29, 1987. The subject matter of the prior applications is hereby incorporated by reference.

BACKGROUND OF THE INVENTION

This invention concerns lightweight fasteners such as for aerospace applications. A bolt with a roll formed thread and better than usual effective thread run-out is provided. The bolt may be used with a shortened nut with a truncated thread for clearance from the bolt thread run-out. Because of such improvements the nut and bolt can each be up to one pitch length shorter than a conventional nut and bolt. Alternatively, the bolt may be used with a conventional length nut or collar, and the tensile strength of the fastener increased.

Further, such a bolt may be used with a swaged collar rather than a nut, and the enhanced strength or shortened length can be advantageous. The bolt may have some of the thread on its tip deleted to form longitudinal flutes which lock a swaged collar or nut onto the bolt. In such an embodiment, the decreased strength due to deleting some of the thread may be offset by increased strength provided by the improved bolt.

Weight of the fasteners is of great concern in airplanes and other aerospace applications. The nuts, bolts, rivets and the like employed for securing the structural elements of an airplane contribute a substantial portion to the total weight of the airplane since very large numbers of such fasteners are used. It is not unusual to use over 100,000 fasteners on one airplane. Thus, there has been a long effort to reduce the weight of fasteners without decreasing the strength, or preferably decreasing weight while increasing strength. Even an apparently small decrease in weight on an individual fastener can have a large impact on the total weight of an airplane.

Nuts and bolts are ubiquitous fasteners on aircraft. The vast majority of aircraft bolts have roll formed threads because of the superior fatigue properties of these threads as compared with machined or ground threads. To make such bolts, a machined metal blank is rolled between a pair of thread forming dies for placing a thread on the blank. Metal is not removed from the blank in this process, but instead the metal is deformed as the thread forming dies press in to form the root and flanks of the thread. The displaced metal flows outwardly to form the crest of the thread.

A conventional thread rolling die has uniform thread forming ridges and grooves over most of its width for making a uniform thread. The edges of the dies are, however, chamfered or rounded somewhat to avoid damage to the die. This chamfer results in a short run-out zone between the cylindrical shank of the bolt and the end or tip on which the thread is fully formed. The run-out zone is also advantageous on the bolt since it avoids a sudden change in cross section of the bolt which could weaken the bolt, particularly in fatigue.

In conventional threaded aircraft fasteners the run-out zone has a length of up to two times the pitch of the thread. Within the run-out zone the root of the thread is not fully developed because of the chamfer on the roll forming die. That is, the thread is shallower than in the portion of the bolt where the thread is fully developed. Concomitantly, the crest of the thread in the run-out may not be fully developed since less metal is displaced from the root. Thus, in the run-out the outside diameter of the crest of the thread is less than the major diameter in the fully threaded portion. The flanks of the bolt thread, which carry the tensile load on the nut and bolt combination, may or may not be fully developed in the run-out. Thus, in the run-out the thread is referred to as imperfect and is nonfunctional.

The maximum length of the run-out under the specifications used in the aerospace industry is 2P, where P is the pitch of the thread. The actual length of the run-out due to normal manufacturing variations is in the range of from 1.5P to 2P.

Nuts used with conventional aerospace fasteners typically have a counterbore collar concentric with the threaded hole through the nut. The length of the counterbore is such that when fully tightened, the threaded portion of the nut does not extend into the run-out on the bolt. If it were to extend into the run-out there would be thread interference between the crest of the nut thread and the incompletely formed root of the bolt thread, and the nut could not be properly tightened on the parts being secured.

The length of the cylindrical shank of a bolt from its head to the beginning of the thread run-out is referred to as the "maximum grip." If the fastener has a flush head, the grip is from the top of the head to the end of the shank. With a raised head not countersunk into one of the parts being secured, the grip is the cylindrical, unthreaded length of the shank.

The plane corresponding to the maximum thickness of parts to be held by a bolt is sometimes also referred to as the "maximum grip," or "maximum grip plane".

Terminology referring to the form and size of threads as used throughout this specification are those commonly applied t screw threads such as set forth at pages 45-1 through 45-8 of *Tool Engineers Handbook*, 2nd Ed., American Society of Tool Engineers, 1959. High strength aerospace fasteners are designed so that the maximum grip corresponds to the maximum thickness of the parts being secured together. The minimum grip is typically one-sixteenth inch (1.6 mm) less than the maximum grip. For example, an aircraft fastener may have a nominal length of one quarter inch (6.35 mm) for the maximum grip. The fastener would be used for securing together parts having a total thickness in the range of from three-sixteenths inch (4.76 mm) to one-quarter inch (6.35 mm). If the thickness of parts being secured together is exactly one-quarter inch, for example, the installer has the option of selecting either of two conventional fasteners, one to fit at its minimum grip length or the other at its maximum grip length.

The depth of the nut counterbore in a conventional aerospace fastener is the difference between the maximum grip and minimum grip plus about 1.5P. A small amount may be added to account for accumulated manufacturing tolerances. This means when the nut is secured against parts having the minimum grip, the end of the thread in the nut is at the end of the run-out, a distance of about 1.5P from the end of the cylindrical shank of the bolt. When the nut is secured against parts having the maximum grip, the thread in the nut stops about one-sixteenth inch (1.6 mm) plus 1.5P from the end of the run-out. The same concept is present in metric bolts, and the difference between minimum grip and maximum grip is typically one millimeter or two millimeters. Thus, the depth of a nut counterbore is 1 mm or 2 mm plus 1.5P.

It has been recognized that if the thread run-out were reduced to 1P or less instead of 2P, the length of the counterbore on the nut could be reduced, thereby reducing the total length of the nut. This also permits a shortening of the bolt thread and overall length by 1P.

The weight savings in an airplane by reducing the length of both the nut and bolt by as little as 1P can be quite substantial.

Aerospace bolts have been developed with an effective run-out of only about 1P. In one such design, for example, a special roll forming die is used. Instead of tapering the root of the thread and producing an imperfect thread, a full thread is carried to within 1P of the cylindrical shank. The root of the thread then increases in a very short distance toward the shank diameter. This has permitted reduction of the total length of the nut and bolt by 1P without significantly reducing the tensile strength of the nut and bolt combination.

This type of short run-out bolt has drastically reduced fatigue properties as compared with a conventional bolt having a run-out length of up to 2P. An exemplary tensile fatigue test simulates an application where the parts secured together do not have parallel faces. For example, two parts may be secured together with the face engaged by the nut being out of perpendicular with the axis of the bolt shank by three degrees.

In a three degree tensile fatigue test there is comparable off-axis loading which induces some bending in the bolt. In an exemplary fatigue test an assembly of a nut and bolt is cycled between an upper tensile load of 50% of the rated capacity of the combination and a minimum load of 5% of the rated load bearing capacity of the combination. The number of cycles to failure is measured.

In such a test the bolt with a modified thread having only an effective 1P run-out has only about 20% of the fatigue life of a conventional bolt with up to 2P run-out. For example, if a conventional bolt has fatigue life of 100,000 cycles, the modified lightweight bolt may have a fatigue life as low as 20,000 cycles in the three degree off-axis fatigue test. The adverse impact on tensile fatigue is apparently due to having a rather deep thread root close to the maximum grip plane at the end of the cylindrical shank. Such a short run-out bolt is also substantially poorer in a lap shear test than a bolt with a run-out of 2P.

Thus, there are two types of shortcomings in existing aerospace fasteners. In one type of fastener there is adequate tensile strength and tensile fatigue strength, but the fastener is relatively long and therefore relatively heavy. On the other hand, a fastener has been produced which is shorter and hence lighter, but the tensile fatigue properties of that fastener are significantly adversely affected.

Thus, it is desirable to provide an aerospace fastener with a roll formed thread where the length of the nut and bolt can be reduced without reducing either the tension capability of the combination or the off-axis tensile fatigue strength of the combination. It is desirable to provide the option of reducing length, and hence, weight, or maintaining a standard length and increasing strength of the fastener. It is particularly desirable to provide such a combination of a nut and bolt that has increased strength as compared with conventional aerospace fasteners. It is also desirable to make such a fastener using roll forming dies relatively unchanged from conventional roll forming dies.

When designing aerospace fasteners for high volume production one must take into account manufacturing tolerances. The tolerances are quite small but the parts themselves are small and these tolerances should be accounted for in the thread run-out.

The thread on a fastener has a specified pitch diameter $D_P$. The blank on which the thread is rolled is typically machined to have a tip diameter substantially the same as the pitch diameter of the finished thread. There is a certain tolerance, however, on the machined diameter and the actual size may be slightly larger or slightly smaller than the nominal. In the parlance of the art when the blank is oversize at the tolerance limit, it is referred to as the maximum material condition, and when it is undersize at the tolerance limit it is referred to as the minimum material condition.

When fasteners are roll formed the actual thread dimensions differ depending on the variation of the blank diameter from the nominal diameter. Thus, the major diameter of the thread for the maximum material condition is larger than the major diameter for the minimum material condition. These may be referred to as the maximum material major diameter $D_{MM}$ and the minimum material major diameter $D_{mM}$. Concomitantly, the minor diameter of the thread at its root also has a maximum material minor diameter $D_{Mm}$ and a minimum minor diameter $D_{mm}$.

The nuts used with such bolts also have maximum and minimum material conditions. The maximum material condition for the nut is essentially one with the smallest hole which is within tolerance. Fasteners are designed so that when both the nut and bolt are in the maximum material condition, there is virtually no clearance between the mating threads. When either or both of the nut and bolt are at less than the maximum material condition, there is some clearance, and the maximum clearance occurs when both a nut and bolt are in the minimum material condition.

There is also a length tolerance on the shank. Thus, the location of the maximum grip plane has a small tolerance. In typical aerospace fasteners, the tolerance on the grip is −0.000 and +0.010 (0.25 mm). The bolt designer must be cognizant of this tolerance as well.

As an example, the bolt must be made so that when it has the maximum material condition and the nut with which it is used has the maximum material condition and the fastener is used on minimum grip parts, the nut can be tightened against the parts without interference by the nut thread against the root of the thread in the bolt runout. Concomitantly, the thread root and the bolt run-out should not be so small as to significantly decrease the strength properties of the bolt.

In a very high proportion of the holes where aerospace fasteners are used, the shank has an interference fit in the hole. The maximum material major diameter of the thread is smaller than the shank diameter so that the tip of the bolt can be readily inserted in the hole. It is common to provide a lead-in at the end of the shank for a smooth transition between the shank diameter and the major diameter of the thread to assist in guiding the shank into the hole. Typically, the lead-in takes the form, in a longitudinal cross section of the bolt, of a convex arc which is tangent to the shank diameter a short distance from the maximum grip plane and decreases toward the major diameter on the other side of the grip plane. Thus, at the grip plane, the bolt diameter is slightly smaller than the shank diameter. The lead-in continues to a diameter that is at least smaller than the maximum material major diameter. The lead-in is formed on the machined blank rather than being developed during the roll forming step.

A smooth continuous curve has been defined for the run-out of the thread root for maximizing strength and minimizing weight of fasteners. There are acceptable deviations from the defined curve which are within tolerance. As long as the thread root run-out falls within a carefully defined envelope, the strength of the fastener is maintained and there is no interference between the crest of the nut thread and the root of the bolt thread in the run-out.

BRIEF SUMMARY OF THE INVENTION

Thus, there is provided in practice of this invention according to a presently preferred embodiment, a threaded bolt having a cylindrical shank and a tip with a roll formed thread. Between the shank and the fully developed thread on the tip there is a run-out zone having a length in the range of from 1.4P to 2.3P from the maximum grip plane of the bolt, where P is the pitch of the thread. In the run-out the root of the thread tapers along a continuous concave curve from the minimum root diameter at a distance of from 1.4P to 2.3P from the shank to approximately the diameter of the shank at its end. The radius of curvature of the concave run-out is in the range of from 1.4P to 2.7P. The run-out may have an inflection near the maximum grip plane and change to a convex curve to cross the maximum grip plane and end tangent to the shank. Preferably, the crest and flanks of the thread are complete in the run-out at distances greater than 1P from the maximum grip plane, and the concave curve has a radius in the range of from 2P to 2.7P, with the total run-out length being from 1.6 to 2P from the maximum grip plane.

The thread root in the run-out zone is tangent to the minor diameter at one end and enlarges toward the maximum grip plane along a continuous curve within an envelope which is defined in a longitudinal cross section of the bolt by:
- the minimum material minor diameter at distances greater than 1.4P from the maximum grip plane;
- an inner arc with a radius of 2P and tangent to the minimum material minor diameter at 1.4P from the maximum grip plane and extending outwardly until at a diameter at least greater than the minimum material pitch diameter of the thread;
- a smooth transition between the inner arc and the minimum material lead-in between the maximum material pitch diameter and the minimum material major diameter;
- an outer arc with a radius of 2P and tangent to the maximum material minor diameter at 1.8P from the maximum grip plane and extending outwardly to a diameter at least larger than the minimum material major diameter;
- a nut clearance arc with a radius of 5P and tangent to the maximum material minor diameter at a distance of 2.3P from the maximum grip plane extending from 2.3P from the maximum grip plane to an intersection with the outer arc; and
- a smooth transition between the outer arc and the maximum material lead-in between the minimum material major diameter and the maximum material major diameter; plus
- a root radius tangent to the outer arc or nut clearance arc at one end and tangent to the flank of the thread at the other end and having a radius of curvature of not less than the radius of curvature of the thread root in the fully formed thread.

A nut used with the bolt has a hole with a thread, and a counterbore at one end of the hole. A run-in truncating the crest of the thread extends into the thread from the counterbore with a larger diameter at the end of the counterbore and a smaller diameter at a distance of at least 1.8P from the maximum grip plane of a bolt with which the nut is used. The convexly curved run-in is approximately a complement of the run-out of the root of the bolt thread, and preferably has a radius in the range of from 1.4 to 2.7P. When such a nut and bolt are assembled on minimum grip parts, the run-in the nut provides clearance between the truncated crest of the nut thread and the root of the bolt thread in the run-out. This permits the nut to be threaded onto the bolt with a partial thread in the nut engaging a partial thread on the bolt when gripping parts of minimum dimensions.

The bolt may also be used with a collar that is swaged onto the threaded tip. When used on minimum grip parts, the swaged collar engages incomplete thread in the run-out. With either a nut or swaged collar, the engagement of the partial threads enhances the strength of the combination without increasing over all length.

BRIEF DESCRIPTION OF THE DRAWINGS

These and other features and advantages of the present invention will be appreciated as the same becomes better understood by reference to the following detailed description when considered in connection with the accompanying drawing wherein:

FIG. 3 illustrates in fragmentary longitudinal cross-section the run-out zone of the thread 180° around the bolt from the cross-section illustrated in FIG. 2;

FIG. 4 illustrates schematically the geometry of the blank from which such a bolt is roll formed;

FIG. 9 is a fragmentary longitudinal cross section of a bolt and swaged collar.

DETAILED DESCRIPTION

Figure 1:
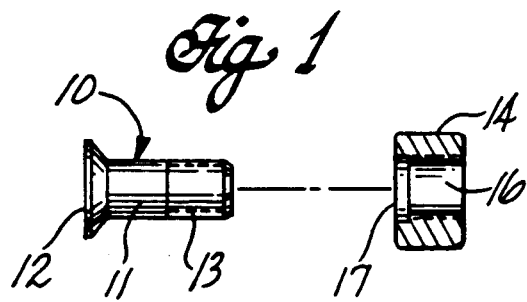
FIG. 1 illustrates in side view and cross-section an exemplary bolt and nut, respectively, of a type employed in practice of this invention.

An exemplary aerospace bolt 10 has a cylindrical shank 11, a head 12, and a threaded tip 13. In the jargon of the fastener art, the bolt may be referred to as a pin, the shank may be referred to as the grip, and the tip may simply be referred to as the thread. In the illustration of FIG. 1 a flush head bolt is shown. It will be understood, however, that a broad variety of bolt heads are employed in the fastener industry and the specific head is of no concern in practice of this invention. It will also be recognized that the bolt need not be torqued from the head but may have means at the end of the tip or dog for receiving or resisting torque. For example, a breakaway portion may be attached to the tip when a blind fastener is employed. Such features of the bolt are not material since this invention concerns the thread.

Figure 5:
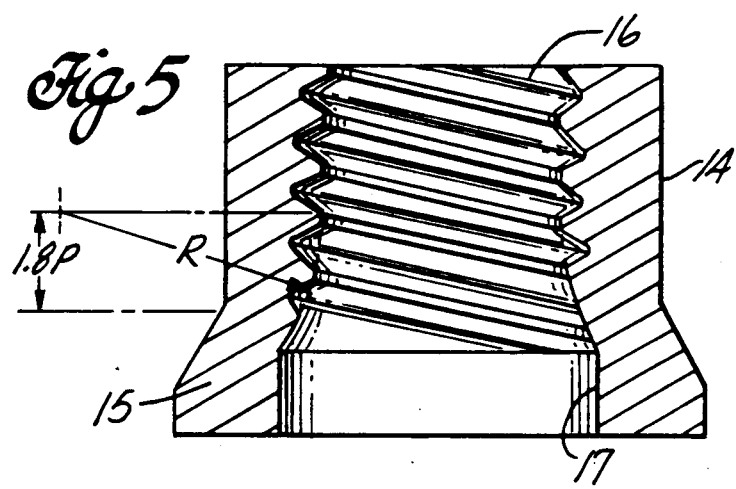
FIG. 5 illustrates a nut for the fastener in longitudinal cross-section.

An exemplary nut 14, as illustrated in FIG. 5, has a threaded hole 16 and a counterbore 17 at one end of the thread to form a collar 15 which fits over the bolt shank when parts have less than maximum grip. The external form of the nut is not material to practice of this invention.

Figure 2:
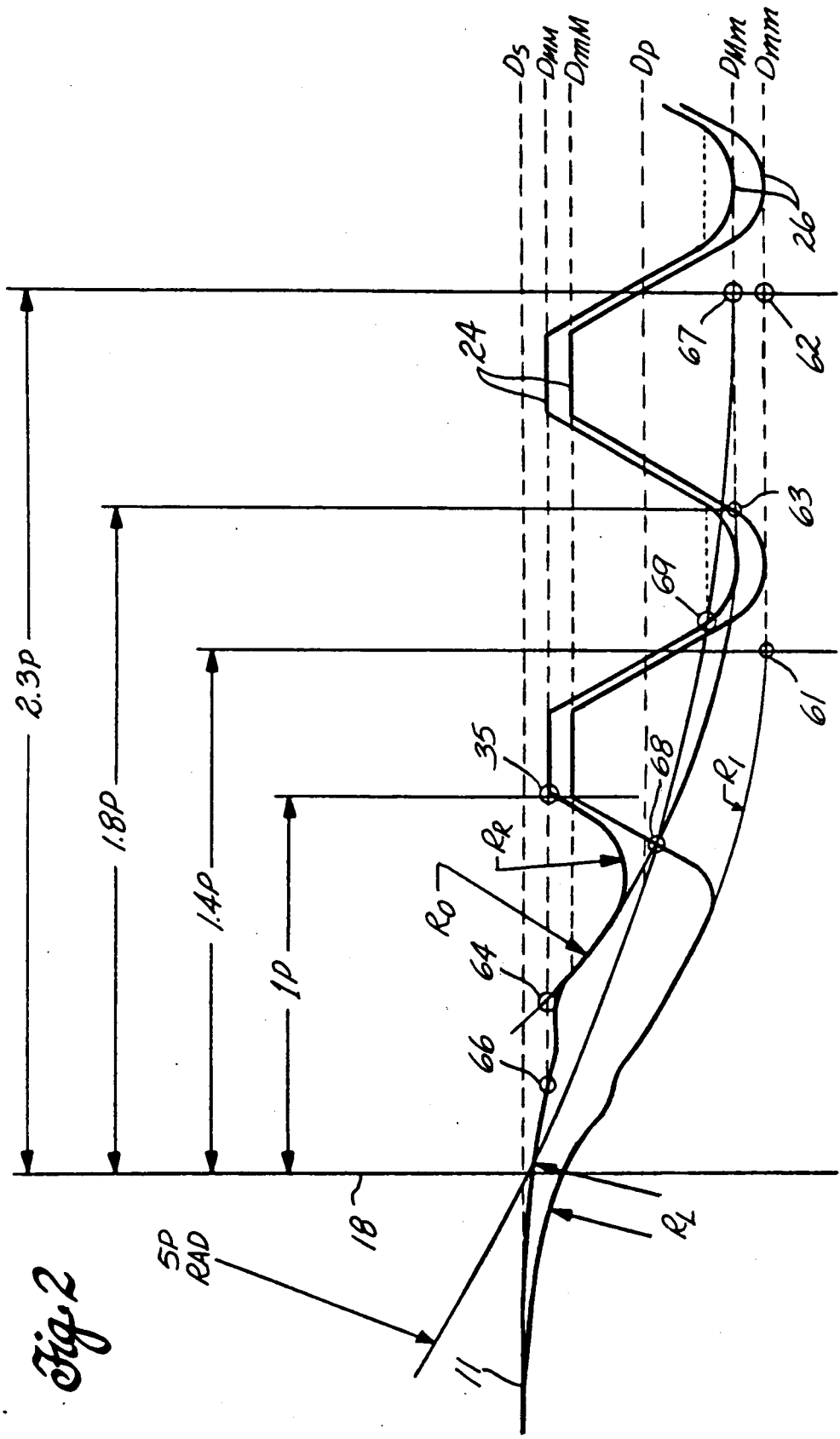
FIG. 2 illustrates in fragmentary longitudinal cross-section the run-out zone of the thread on a bolt as provided in practice of this invention.

As illustrated in FIG. 2 a typical fastener made under thread specification MIL-S-8879 has a 60° thread form; that is, the flanks of the thread are at an included angle of 60°. The pitch P of the thread is the distance from the flank of the thread at the pitch diameter $D_P$ to the corresponding location at the next turn of the thread. In other words, the pitch is 1/n where n is the number of threads per inch. In FIG. 2 the thread is illustrated in both its maximum and minimum material conditions. The space between represents the tolerance for manufacturing such a bolt and in production, bolts throughout this range are commonly encountered.

The diameter of the bolt shank is $D_S$. The nominal pitch diameter of the thread on the tip is $D_P$. The major diameter in the maximum material condition, $D_{MM}$, is the diameter of the crest 24 of the bolt thread when the bolt is made from a blank in the maximum material condition. Similarly, the major diameter in the minimum material condition is indicated by $D_{mM}$. The symbol $D_{Mm}$ is the minor diameter when the bolt is in the maximum material condition and is the diameter at the root 26 of the bolt thread. Similarly, the symbol $D_{mm}$ is used to indicate the minor diameter when the bolt is in the minimum material condition. In aerospace fasteners the maximum material major diameter $D_{MM}$ is usually less than the shank diameter $D_S$.

The end of the cylindrical shank 11 is at a plane 18 corresponding to the maximum grip of the bolt. This plane itself is commonly referred to as the maximum grip of the bolt. Preferably, at a distance greater than 1.8P from thread is fully developed by roll forming to conform to the applicable standard, such as MIL-S-8879. As will appear hereinafter, the thread root may not be fully formed out to 2.3P and the nut in its maximum material condition will still clear the bolt thread root.

Except in the run-in described hereinafter, the thread on the nut engages the bolt thread in a conventional manner. In the maximum material condition for both nut and bolt there may be a very tight fit on both flanks of the threads. The maximum material condition is the condition when the bolt has its largest volume and hence is at the maximum dimensions permitted for the particular bolt specification. Concomitantly, the nut has its maximum volume and the size of the threaded hole is at a minimum. This is the tightest fit of the nut and bolt. The flanks of the threads on the side of the bolt thread nearer the shank are in tight engagement and a small clearance may be present between the flanks of the nut and bolt shank. This would be a typical condition when the nut is tightened on the bolt.

The minimum material condition is analogous. In that condition the bolt is at its smallest diameter and the nut has its largest inside diameter within the ranges permitted by the applicable specified tolerances. Obviously either or both of the nut or bolt can be at sizes between the maximum material and minimum material conditions. Fasteners are designed to allow for both extremes, maximum material and minimum material, of the tolerance ranges.

The crest of the thread on the bolt is complete at all distances greater than 1P from the maximum grip plane. The flank of the thread is fully developed or complete at all distances greater than 2P from the maximum grip plane. This assures maximum load carrying capability and lightest weight of the fastener.

A bolt thread run-out zone extends a distance in the range of from 1.4P to 2.3P from the maximum grip plane 18. Preferably the run-out zone has a minimum length of 1.4P to avoid degrading fatigue properties of the bolt. The run-out zone has a preferred maximum length of 2.3P so that the total length of the nut and bolt assembly can be shortened as compared with standard aerospace fasteners.

The shape of the root of the thread in the run-out zone is indicated in FIG. 2 by an envelope to accommodate a range of tolerances or differences between maximum material and minimum material conditions. The shank diameter $D_S$ is indicated as a single line, as is the maximum grip plane 18. The maximum grip plane does not have a discernable mark on the bolt, but as pointed out hereinabove, is a specified distance from the bolt head.

The minor diameter $D_m$ is illustrated as two straight lines at a distance greater than 1.8P from the maximum grip plane. In this drawing the lower line $D_{mm}$ is nearer the axis of the bolt and represents the minimum diameter the root of the thread may have within the tolerance ranges specified, i.e., the minimum material condition for the bolt. The upper line $D_{Mm}$ represents the minor diameter in the maximum material condition.

In an exemplary embodiment, the difference between the minimum and maximum acceptable minor diameters is about 0.005 inch (130 microns). Two lines $D_{MM}$ and $D_{mM}$ are also illustrated for the major diameter of the thread on the bolt at the maximum and minimum material conditions, respectively. The range of tolerances for the major diameter is about one-half that of the minor diameter. In an exemplary embodiment, the difference between the shank diameter $D_S$ and the maximum material major diameter $D_{MM}$ is about 0.004 inch (100 microns) Thus the distance between the radii illustrated in FIG. 2 is 0.002 inch (50 microns).

Within the run-out zone the minor diameter run-out follows a continuous S-shaped curve having a concave portion nearer the tip and a convex curvature nearer the shank in what is referred to as the lead-in. The root run-out is smooth: that is, it is not discontinuous, and the concave and convex portions blend more or less smoothly into each other. The shape of the transition between the concave and convex portions is not significant although its location is. The inflection occurs between the pitch diameter and the maximum material major diameter $D_{MM}$. The concave curve defining the root of the thread in the run-out zone intersects the convex lead-in a short distance beyond the maximum grip plane of the bolt.

Depending on the location of the center of curvature, the radius of the concave portion is in the range of from 1P to 5P, and preferably is in the range of from 2P to 2.7P. A radius of as small as about 1P may be present tangent to the minimum material minor diameter $D_{mm}$ at a distance of 1.4P from the maximum grip plane. A radius as large as 5P may be present tangent to the maximum material minor diameter $D_{Mm}$ at a distance of 2.3P from the maximum grip plane.

It is preferred that the concave radius be in the range of from 2P to 2.7P and tangent to the minor diameter at 1.8P from the maximum grip plane. This range provides adequate manufacturing tolerances, whereas when one designs close to the broader limits, there are very small tolerances.

As used herein the term "concave curve" is used to refer to a curved contour which in longitudinal cross section is concave toward the direction away from the material of which the fastener is made. Conversely, an outwardly convex curve refers to a curvature that is convex away from the material of the fastener when seen in longitudinal cross section (as, for example, in FIG. 2).

In a preferred embodiment, a slight convex "lead-in" is provided on the end of the cylindrical shank adjacent to the maximum grip plane. The curvature of the lead-in is illustrated in FIG. 2 by a radius $R_L$. When the bolt is in the minimum material condition for the shank length, the lead-in radius $R_L$ is centered at a maximum distance of 0.021 inch (0.53 mm) from the maximum grip plane 18. This assures that the lead-in radius is tangent to the shank diameter at a maximum distance from the maximum grip plane of 0.021 inch (0.53 mm). When the shank is in its maximum material condition of length, the lead-in radius may have its center nearer the maximum grip plane by up to about 0.010 inch (0.25 mm). In other words, the radius $R_L$ may be centered as little as 0.011 inch (0.28 mm) from the maximum grip plane. The total axial length of the lead-in (from the maximum material major diameter to where the lead-in is tangent to the shank diameter) is in the order of 0.75P. In a typical embodiment the radius $R_L$ is about 0.075 inch (1.9 mm).

There is an envelope within which the root of the thread in the run-out must lie to prevent substantial degradation of the properties of the bolt, on one hand, and on the other hand, permit the nut assembled on the bolt to fit tightly against the parts being connected without interference with the thread root. There are a number of considerations involved in defining the boundaries of that envelope for both the maximum material condition and the minimum material condition. For purposes of defining the bolt thread envelope, it is assumed that the nut is in the maximum material condition since this is the dimension that must be cleared by the thread root.

For the minimum material condition of the bolt, the inner boundary of the envelope is along the minimum material minor diameter $D_{mm}$ at distances greater than 1.4P from the maximum grip plane. This is represented by the point 61 in FIG. 2. The envelope continues along the minimum material minor diameter through and beyond point 62 which is at a distance of 2.3P from the maximum grip plane.

The inner boundary of the envelope continues toward the shank beyond point 61 along an inner arc having a radius $R_I$ of 2P and tangent to the minimum material minor diameter at 1.4P from the maximum grip plane. The inner arc continues outwardly until at a diameter at least greater than the pitch diameter $D_P$. The convex lead-in for the minimum material condition extends from the shank diameter to a diameter at least beyond the minimum material major diameter $D_{mM}$. There is then a smooth transition between the inner arc and the minimum material lead-in which for purposes of illustration is drawn as a small "wiggle" blending the non-intersecting curves together. This inner portion of the boundary of the envelope defines the smallest dimensional tolerances for the run-out in the minimum material condition.

The boundary of the envelope for the maximum material condition is somewhat more complex. As a starting point, there is an outer arc with a radius $R_O$ of 2P and tangent to the maximum material minor diameter $D_{Mm}$ at 1.8P from the maximum grip plane (point 63 in FIG. 2). The outer arc extends outwardly to a diameter at least larger than the minimum material major diameter $D_{mM}$ and not as far as the maximum material major diameter $D_{MM}$; that is, the outer arc ends a short distance inwardly from point 64 in FIG. 2. This defines a short sector of the maximum material boundary of the envelope from near the point 64 inwardly toward a distance 1P from the maximum grip plane.

The convex lead-in for the maximum material condition extends from the shank diameter inwardly to a diameter smaller than the maximum material major diameter $D_{MM}$, namely past the point 66. There is a smooth transition between the outer arc and the maximum material lead-in between the minimum material major diameter $D_{mM}$ and the maximum material major diameter $D_{MM}$, illustrated in FIG. 2 as a somewhat arbitrary "wiggle" inter-connecting the non-intersecting curves of the outer arc and convex leadin.

A concave transition is provided between the outer arc and the crest of the thread at a distance of 1P from the maximum grip plane at the maximum material major diameter $D_{MM}$, corresponding to the point 35. The root outer arc at one end and tangent to the flank of the thread at the other end. There is an allowable root radius $R_R$ in this concave transition which avoids having a sharp re-entrant "notch" which would impair the properties of the bolt. At a minimum, the root radius is no less than the radius of the root of the fully formed thread on the tip. Preferably, the root radius has a curvature in the range of from about 0.003 to 0.006 inch (75 to 150 mm) depending on the thread size.

In addition, the envelope is defined by a nut clearance arc having a radius of 5P tangent to the maximum material minimum diameter $D_{Mm}$ at a distance of 2.3P from the maximum grip plane, namely at point 67. The nut clearance arc extends outwardly and toward the shank to an intersection with the outer arc at point 68 in FIG. 2.

In the position around the thread as illustrated in FIG. 2, the intersection point 68 is inwardly of the root in the concave transition. Further around the thread (180° from the position of FIG. 2, as illustrated in FIG. 3, for example) the concave transition is further to the right than in FIG. 2 and the intersection point 68 is at the boundary of the envelope. In other words, the extra portion of envelope defined by the concave transition is a moving region which becomes deeper from the thread crest as the root of the thread moves toward the tip of the bolt. The concave transition does not extend closer to the bolt axis than the nut clearance arc, and in places it may be tangent to the nut clearance arc.

The significance of the nut clearance arc can be seen from the dotted line to the right of point 69 in the FIG. 2. This line represents the crest of the nut thread in its maximum material condition. It will be noted that the nut clearance arc and the nut thread crest barely intersect at point 69. If the envelope were larger than the nut clearance arc, there would be interference between the nut thread and the root of the bolt thread in the runout when the nut was tightened against minimum grip parts.

The dimensions which define the run-out zone and associated structure depend on the thread pitch because of its effect on thread depth. The actual parameters vary somewhat from the stated numbers which are approximations or rounded off values. The variation is suggested by the following table of representative dimensions for three different thread pitches which are standard in the United States. The concave radius of the thread root in each example is 2P and the center of the concave radius is at 1.8P from the maximum grip plane. For each nominal proportion of the run-out described herein the table states an actual value for a given pitch based on calculation of the exact parameters. These numbers would differ somewhat for other specific embodiments. For example, they would different for other values of the concave radius of the thread root or for differences in the location of the center of curvature.

TABLE

| Pitch (per inch) | Parameter | | | | |
| --- | --- | --- | --- | --- | --- |
| | 1 P | 1.4 P | 1.8 P | 2.3 P | 5 P |
| 32 | 1.040 P | 1.283 P | 1.779 P | 2.327 P | 5.309 P |
| 28 | 1.113 P | 1.414 P | 1.755 P | 2.327 P | 5.168 P |
| 24 | 1.00 P | 1.329 P | 1.739 P | 2.327 P | 4.877 P |

Figure 6:
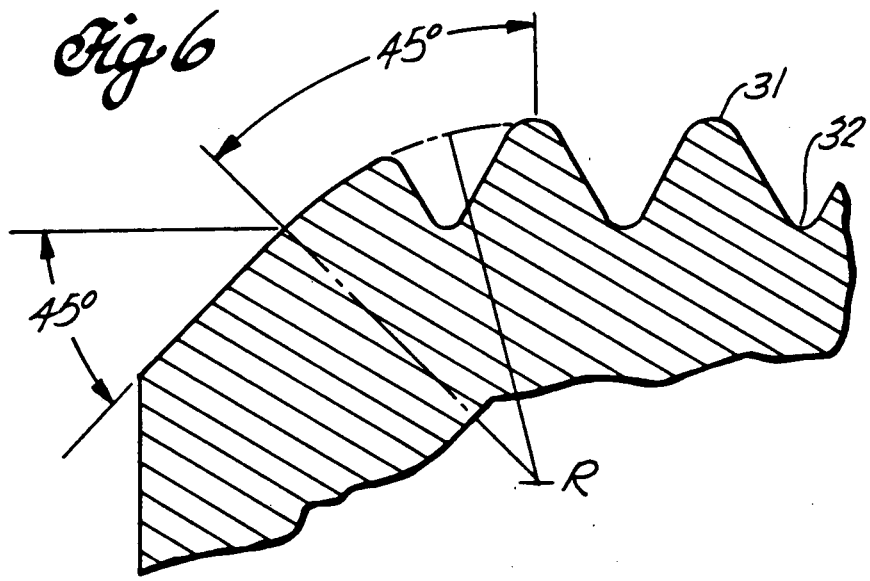
FIG. 6 is a fragmentary cross section of the edge of a roll forming die used to form a bolt as provided in practice of this invention.

The concave curve of the minor diameter in the run-out zone is formed by controlling the shape ground on the edge of the roll forming die used to form the thread on the bolt and the geometry of the unthreaded blank from which the bolt is roll formed. FIG. 6 illustrates in fragmentary cross section the edge of one of a pair of such a roll-forming dies. A conventional roll-forming die has a plurality of parallel ridges 31 and grooves 32 on one face with the ridges and grooves having a cross section complementary to the threads to be rolled. The ridges and grooves are skewed relative to the edge of the die by an amount appropriate for rolling a continuous thread on the tip of a bolt of a selected diameter. To form a bolt, a machined or ground blank is rolled between a pair of such dies.

The edge of the die is ground to a shape complementary to the concave curve hereinabove described and illustrated in FIG. 2. Thus, for example, the radius of curvature R on the edge of the roll forming die is preferably in the range of from 2P to 2.7P. After the concave curve begins tangent to the plane of the crests of the thread forming ridges on the die. It extends toward the edge to a sufficient distance from the plane of the crests of the thread forming ridges to clear the maximum material major diameter of the fastener, and a buttress chamfer from the convex curve to the edge of the die. Between the end of the convex curve and the edge of the die there is a buttress chamfer. Typically, the convex curve is approximately tangent to the buttress chamfer. Preferably, the edge of the die is chamfered at about 45° to serve as a buttress and prevent edge chipping or the like. If the angle of the buttress chamfer is significantly less than 45°, chipping may occur. If the angle is significantly greater than 45°, a smooth tangency with the convex curve is difficult and there may be interference with the bolt shank during thread rolling.

Previously it has been the practice to simply grind a conical transition on a bolt between the cylindrical shank and the pitch diameter of the tip. A illustrated in FIG. 4, the blank from which a bolt made in practice of this invention is roll formed is ground to have a longitudinal cross section with a generally S-shaped curve in the run-out zone from near the maximum grip plane 18 to the tip diameter. Preferably the distance where the S-shaped curve is tangent to the tip is in the range of from 1.6P to 2P from the maximum grip plane. The tip of the bolt blank is ground to substantially the pitch diameter $D_P$ of the thread to be formed.

The generally S-shaped curve in the run-out zone is tangent to the shank diameter at a distance from the maximum grip plane corresponding to the desired lead-in. The curve has a relatively larger convex radius $R_A$ as it crosses the maximum grip plane. There is then a relatively smaller convex radius $R_B$ to a very short conical transition section 34 which ends in a concave radius $R_C$. The concave part of the curve leads to a conical section 35 which ends at the pitch diameter $D_P$ at a distance from the maximum grip plane in the range of from 1.6 to 1.8P. A controlled radius is not significant at the intersection of the conical section and the pitch diameter since this region is heavily distorted during roll forming and the shape is controlled entirely by the roll forming die. This intersection is in the range of from 1.6P to 1.8P from the maximum grip plane 18. The generally S-shaped curve intersects the lead-in at the same range of locations as the curve defining the intersection of the concave minor diameter run-out and the lead-in after the bolt has been roll formed.

Thus, the generally S-shaped curve has a convex portion adjacent to the shank diameter $D_S$, and a straight portion adjacent to the tip diameter. There is a concave transition between these portions. In a preferred embodiment, there is a shorter radius convex portion and a short straight portion between the longer radius convex portion near the shank and the concave curved portion. This generally S-shaped curve can be modified somewhat to have slightly curved portions instead of the straight portions in the illustrated embodiment.

An example of such a blank is instructive. For a blank for forming a 3/16 inch (4.76 mm) diameter aerospace fastener the larger convex radius $R_A$ is in the range of from 0.080 to 0.085 inch (2.03 to 2.16 mm) and the smaller convex radius $R_B$ is in the range of from 0.012 to 0.016 inch (0.3 to 0.41 mm). The center of curvature of the larger convex radius is at a distance of 0.014 to 0.016 inch (0.36 to 0.41 mm) from the maximum grip plane. The center of curvature of the smaller convex radius is at the maximum grip plane. The conical section 35 has an angle of from 5°12' to 5°28' from the axis of the blank. The very short section 34 between the convex curvature and the concave curvature has an angle of about 30° from the axis of the blank. The concave radius $R_C$ is in the range of from 0.015 to 0.018 inch (0.38 to 0.46 mm). The location of its center of curvature depends on the accumulated tolerances of the other parts of the generally S-shaped curve. Such a generally S-shaped curve can be readily ground on the blank by a conventional cam following grinder. Other dimensions are appropriate when the length and curvature of the run-out zone on the finished bolt are outside of the preferred ranges.

It will also be recognized that the location of the maximum grip plane is subject to some tolerance from the head of the bolt. Typical tolerance on the grip length for an aerospace fastener is ±0.005 inch (0.13 mm). Similarly, in defining the dimensions for this invention, there will be some tolerances from the midpoints specified herein.

Since the run-out zone on the bolt blank is ground with a larger diameter than would completely clear the corresponding edge of the roll-forming die, a partially complete thread is rolled in the run-out zone. At least that portion of the thread inwardly (toward the bolt axis) from the generally S-shaped curve is complete. An additional portion of the thread outwardly from the generally S-shaped curve has complete flanks which are thereby available to carry tensile load between the nut and bolt. This is due to flow of metal outwardly into the grooves of the thread rolling dies as the ridges of the dies deform the blank.

As described in our previous patent application, the nut used with the improved bolt has a thread with the uniform pitch P to mate with the thread on the bolt. In the usual embodiment there is a cylindrical counterbore for clearing the shank of the bolt. The nut is threaded for the full length between the counterbore and the opposite end of the hole.

Extending from the counterbore into the thread is a "run-in" truncating the crest of the thread. The run-in has a larger diameter at the end of the counter-bore, and a smaller diameter approximately the same as the diameter of the crest of the nut thread at a distance of at least 1.8P from the counterbore.

A bolt as provided in practice of this invention has at least a portion of the flanks of the thread in the runout which is fully developed. In conventional roll forming of threads, there is an insufficient volume of metal in the blank to fill the thread groove in the die with displaced metal, resulting in an incomplete thread in the run-out. Since it has been anticipated that the thread may be incomplete, any contribution a partially complete thread might provide toward enhancing the strength of the nut and bolt combination has previously been deliberately sacrificed by extending the counterbore into the nut so as to always be beyond the run-out. Further, the maker of the roll forming die has devoted little attention to the precision of the chamfer at the edge of the die since it has little effect on the final product.

It is desirable, as mentioned above, to reduce the length of the collar, i.e., the depth of the counterbore in a nut so that the total length of the nut can be reduced with a concomitant reduction in the length of the bolt. Conventional aerospace nuts have had a counterbore depth of 1/16 inch (1.6 mm) plus 1.5P so that the run-out zone on a conventional bolt is completely cleared by the nut when the nut is tightened in the minimum grip condition. In that condition, the counterbore extends 1.5P beyond the maximum grip plane. There is no contribution to tensile strength of the fastener from any thread formed in the run-out zone on the bolt.

In practice of this invention, the depth of the counterbore is preferably 1/16 inch (1.6 mm, i.e., the difference between the maximum grip and minimum grip) plus no more than 0.5P. Preferably the depth of the counterbore is only 1/16 inch (1.6 mm) plus a small manufacturing tolerance, such as 0.005 inch (0.13mm). In such an embodiment the end of the thread in the nut when screwed onto the bolt in the minimum grip condition is substantially at the maximum grip plane. A run-in truncating the crest of the nut thread is therefore provided to clear the run-out of the bolt thread root and avoid interference when the nut is threaded onto the bolt with the run-in overlapping the run-out. In such an embodiment, the nut can be at least 1P shorter than a conventional nut and the bolt also can be 1P shorter without any decrease in strength.

Alternatively, the nut can be retained at a conventional total length, and because of the increased thread length, albeit incomplete (truncated) at one end, enhanced strength of the fastener may be obtained. Increased tensile strength was as much as 12% in one embodiment.

Figure 7:
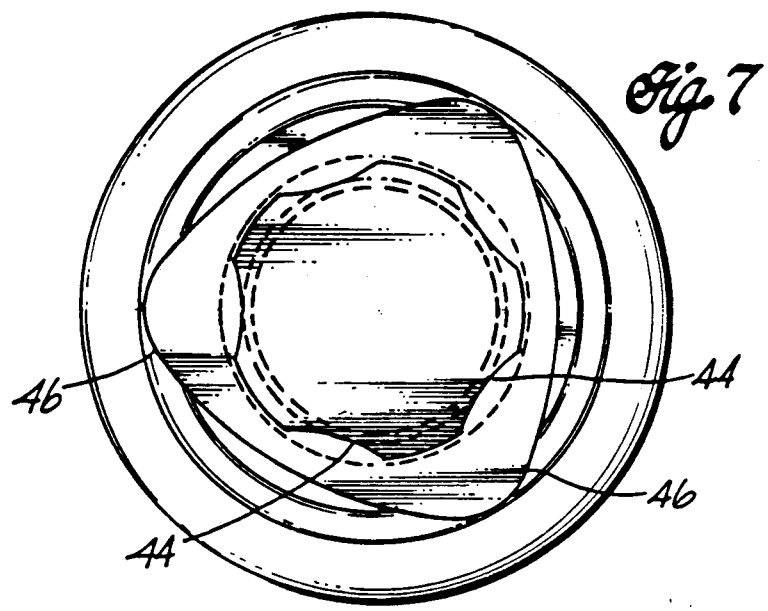
FIG. 7 is an end view of a bolt with flutes in a portion of the thread and a nut used therewith assembled on parts to be fastened.
Figure 8:
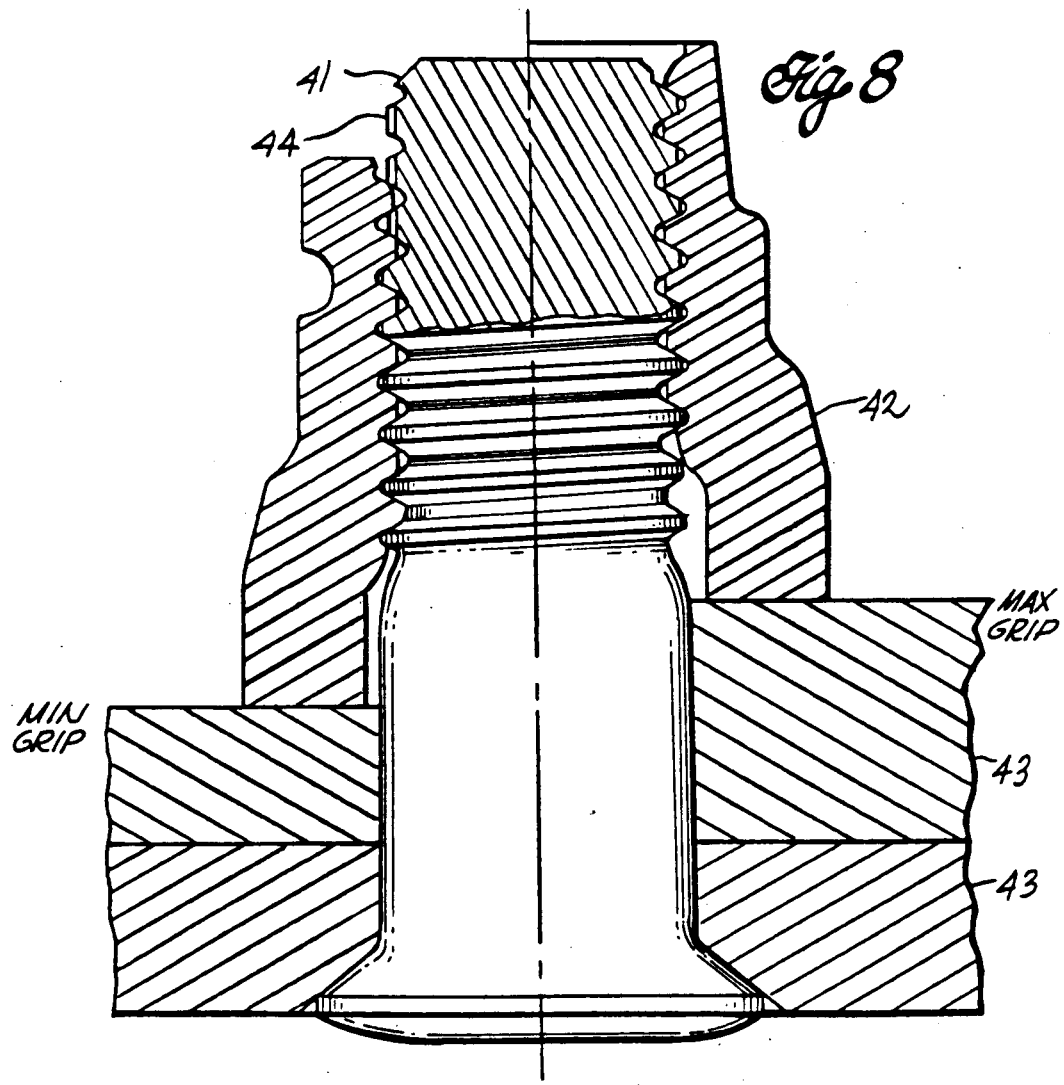
FIG. 8 is a longitudinal cross section of the assembly illustrated in FIG. 7.

FIGS. 7 and 8 illustrate in end view and longitudinal cross section, respectively, a fastener for which practice of this invention is particularly suitable. In this embodiment a bolt 41 and nut 42 are used for fastening together two parts 43 of a structure such as an aircraft skin. On the right side of FIG. 8 the parts 43 are illustrated in the maximum grip thickness suitable for the bolt. The nut is threaded onto the bolt far enough to hold the parts securely. At the left side of FIG. 8, the two parts are shown in the minimum grip thickness and the nut is threaded further onto the bolt to secure the parts tightly.

In this embodiment the end three to four turns of the thread on the bolt have five flat or somewhat concave longitudinal flutes 44 where the crest of the thread is truncated. Such flutes can be formed by roll forming the bolt from a blank having five flats near the end of the tip or by grinding the flutes after the bolt is roll formed.

The exterior of the nut has three lobes 46 on its periphery at the end remote from the parts to be fastened. Such a nut is assembled on a bolt having flutes with a special driver. When the nut tightly engages the parts to be fastened, continuing torque on the driver deforms the lobes and hence the internal threaded portion of the nut so that metal is displaced into the flutes where bolt thread is deleted. The deformed metal tends to lock the nut onto the bolt so that the breakaway torque required for removing the nut is appreciably larger than the breakaway force for a nut on a bolt without such flutes. Such a fluted bolt and lobed nut are already known.

The presence of the flutes where some of the bolt thread is deleted tends to reduce the tensile strength of the fastener, particularly when the nut is tightened against maximum grip parts and a greater portion of the nut thread is in the fluted region near the end of the bolt. In this condition the added strength due to engagement of the truncated nut thread in the run-in with the bolt thread tends to offset the strength reduction which would otherwise be observed. The additional thread in the nut is feasible because of the controlled run-out on the bolt, permitting clearance of the added nut thread and the enlarging root in the bolt run-out.

FIG. 9 is a fragmentary cross section of a bolt with a collar swaged onto the bolt when in the minimum grip position. This view is taken directly from a micrograph of a 3/16 inch titanium alloy bolt 51 and aluminum alloy swaged collar 52, near, but not necessarily right on, the axis of the bolt. It can be seen that the aluminum collar has been deformed so that the wall of the hole through the collar engages thread in the run-out as well as in the thread further along the tip.

The softer aluminum of the collar does not fill to the root of the harder thread on the bolt, but that is not necessary since the mode of failure of such a fastener in tension is by shearing of the aluminum along the crest of the bolt thread. Additional aluminum nearer the thread root would have no contribution to strength. Thus, by having the crest of the thread complete more than 1P from the maximum grip plane, the thread in the run-out makes a definite contribution to the tensile strength of the fastener.

It is an important feature of this invention that when a nut is threaded onto a bolt with the run-in overlapping the run-out, the truncated incomplete thread in the run-in engages a completely formed portion of the thread in the run-out on the bolt. At the same time the truncation of the nut thread clears the incomplete thread root in the run-out. For this to occur the incomplete thread in the run-out is at least partly completely formed at diameters greater than the thread root in the run-out. In other words, when the thread in the run-out is roll formed there is sufficient metal deformed by the dies to partly fill the grooves in the dies, and at least a portion of the flanks of the thread are completely formed so as to engage the incomplete thread in the nut run-in.

Thus, when a nut is tightened against minimum grip parts there is a contribution to the tensile strength of the nut and bolt assembly by the engagement of the incomplete nut thread in the run-in with the incomplete thread on the bolt in the run-out. When the nut is in a position other than minimum grip, the incomplete thread in the nut engages complete thread on the bolt and there is a contribution to the tensile strength of the assembly.

Because there is a contribution from the incomplete thread in the run-in, the length of the complete thread in the nut can be reduced as compared with a conventional nut having the same ability to carry a tension load. Since the portion of the nut with a complete thread is shorter, the portion of the bolt with a complete thread can also be shorter. The tension carrying ability of the bolt is maintained since the bolt thread carries the same load as the nut thread, regardless of whether the nut is in the maximum grip position with incomplete run-in thread engaging complete bolt thread, or in the minimum grip position where the incomplete thread in the nut engages incomplete thread in the bolt run-out.

The comparison with conventional fasteners can also be stated somewhat differently. In a conventional fastener the nut has a specified length of complete thread for carrying a certain tension load and a relatively deep counterbore for clearing the required run-out of the bolt thread. In a fastener as provided in practice of this invention the total threaded length of the nut may be increased. A portion of this thread is incomplete because the thread crests are truncated. Since this incomplete thread carries some of the load, the length of the complete thread can be reduced.

Because the incomplete thread in the run-in can clear the root of the incomplete thread on the bolt, the nut can be threaded onto the bolt a greater distance. Because of this, the depth of the counterbore can be shortened since there is no need to provide clearance from the bolt run-out. In effect "useless" counterbore which carries no tension load is traded for useful incomplete thread which does carry tension load. The result of this trade-off is a reduction of the total nut length.

When a nut is threaded on a bolt for assembling maximum grip parts, the end of the nut remote from the parts should approximately coincide with the end of the bolt for minimum weight; any part of the bolt that extends beyond the nut carries no load and is just added weight. Since a nut as provided in practice of this invention has a shorter overall length, the bolt can be concomitantly shorter. Because of the contribution of the incomplete thread the total tension carrying capability of the assembly is not diminished. Since the run-out is kept long there is no abrupt change in cross-section of the bolt, and tensile fatigue properties are maintained. Thus, the fastener has combined the previously inconsistent properties of light weight and high strength.

For some applications of threaded fasteners, the part that fits on the bolt is not originally threaded, but instead is in the form of a sleeve or "collar" 51 having an axial hole that is slipped onto the bolt 52 and then swaged to crush it inwardly to tightly engage the bolt thread as illustrated in FIG. 9. The controlled bolt run-out provided in practice of this invention is desirable with swaged collars, too. When a swaged collar is applied when the fastener is used on minimum grip parts, the collar is swaged into the partially complete thread in the run-out to carry tensile load. This was not previously a reliable source of tensile strength and the collar needed to be designed as if there were no contribution from thread in the bolt run-out.

Now with this invention, engagement of the collar with partially complete thread in the run-out contributes to tensile strength and the collar length can be concomitantly shorter. When a swaged collar is used with the improved bolt on parts thicker than the minimum grip, the thread engagement is similar to a conventional bolt, but the enhanced properties due to the controlled run-out are still enjoyed.

For maximum ability to engage flanks on the thread in the run-out, it is preferred that the truncation of the crest of the thread in the nut have a convex curve complementary to the concave curve of the minor diameter run-out. Thus, the run-in follows a convex curve having a radius in the range of from 2P to 2.7P. Thus, when the nut is on the bolt in the minimum grip condition, a portion of the nut thread in the run-in can engage the flank of the thread in the bolt run-out.

In practice some bolts are made "oversize". Such bolts are made with a larger than standard shank to substitute for a standard bolt when a hole in parts to be joined is slightly oversize due to repair work. It may occur, for example, that a hole is damaged so that a standard bolt no longer fits properly. Such a hole is then reamed 1/64 inch and a larger bolt is used. Thus, it is standard practice to provide "first oversize" and "second oversize" bolts which are 1/64 and 1/32 inch larger than a standard size bolt.

The oversize bolts typically have an oversize shank, with the original thread size on the tip. This requires a somewhat shorter radius run-out than a standard bolt while maintaining the length of the run-out in the range of from 1.4P to 2.3P. The nut employed on an oversize bolt has a larger diameter counterbore than a nut for a standard size bolt to clear the larger diameter shank. It is sometimes desirable to employ the first oversize nuts on both standard and first oversize bolts so that a separate stock of nuts does not need to be maintained in inventory. In such an embodiment the radius of curvature of the run-in in the nut is somewhat smaller to assure clearance of the thread root run-out in a first oversize bolt. For this reason the radius of the convexly curved run-in in the nut may be reduced to 1.7P.

The partial engagement of the nut thread with the bolt thread, regardless of whether in the minimum grip or other position, is also believed to contribute to the fatigue strength of the improved fastener.

In a fastener without a run-in as provided in practice of this invention, a high proportion of the tensile load is carried by the first two or three turns of the thread. It is known, for example, that the first turn of a thread in a five turn nut may carry as much as 40% of the load, with the balance being distributed in a gradually decreasing amount with increasing distance from the end of the nut. This results in a high stress in the bolt adjacent to the beginning of the thread in the nut.

By having only partial engagement between the truncated thread in the nut and the thread on the bolt, the tensile load is distributed more uniformly along the thread in the nut and hence the maximum stress imposed on the bolt is reduced. This effect occurs whether the nut is in the minimum grip or maximum grip condition or at some location therebetween. This lowered stress level is believed to contribute to the increased fatigue strength of the fastener.

The changed distribution of the load on the nut thread may also contribute to the increase in tensile strength. It is a common practice to make nuts with a weaker material than bolts so that ultimate failure in tension occurs by shearing off the nut thread rather than breaking the bolt. A truncated thread adjacent to the end of the nut may result in deformation of the first part of the thread and distribution of the load more uniformly with distance from the end of the nut. This could lower the maximum stress on the thread and delay the onset of shear failure. Regardless of the reason, it has been observed that a nut as provided in practice of this invention not only does not show any decrease in tensile load carrying capacity, but may actually show a small increase in strength in some embodiments.

In summary, in the run-out on the bolt the root of the thread decreases along a continuous S-shaped curve from the shank diameter at about the maximum grip plane to a location tangent to the minor diameter of the thread root at a distance from 1.4P to 2.3P from the maximum grip plane. The radius of the concave curve is preferably in the range of from 2P to 2.7P. Preferably the length of the run-out may be in the range of from 1.6P to 2P. The radius of the concave curve may be as low as 1P to correspond to the length of the shorter run-out where a shear type loading predominates, and may be as great as 5P.

A nut with convexly curved run-in as provided in practice of this invention provides some engagement of the truncated nut thread with the thread on the bolt in the run-out when the assembly is tightened on minimum grip parts, thereby adding to the tensile strength of the assembly. The truncated thread maintains partial engagement with the thread on the tip of the bolt when tightened on thicker than minimum grip parts. The truncation of the nut thread prevents interference with the root of the bolt thread in the run-out. Preferably the radius of the curved run-in is in the range of from 1.4P to 2.7P. It is preferably complementary to the root of the bolt thread in the run-out.

It has been found in practice of this invention in a specific example, that a length reduction of at least 1P can be provided in both the nut and bolt, with consequent weight reduction. A 10-32 UNJF fastener is a nominal 3/16 inch fastener which has a pitch of 0.03125 inch. A convex run-in is provided in such a nut for a distance of at least 1.8P from the maximum grip plane when assembled on a minimum grip assembly. A counterbore extends just to the maximum grip plane; that is, an exemplary counterbore has a depth of 0.062 (+0.005−0.000) inch (1.57 mm). The run-in extends into the thread at least 1.8P (+0.005−0.000 inch).

In this embodiment of a 10-32 fastener, a maximum material condition nut can be tightened into a maximum material condition bolt a little more than 0.032 inch further than a standard nut, without interference with the root of the bolt thread. Thus, the nut and bolt can each be shortened 0.032 inch or about 1P without decreasing tensile strength or off-axis tensile fatigue.

A bolt provided in practice of this invention has a roll formed thread, as distinguished from bolts with a machined thread. The thread on a nut employed in practice of this invention may be tapped, or may be made by roll tapping. The geometry of the thread root in the run-out of a roll formed bolt is quite different from a machined bolt. In effect, the flanks of the incomplete thread outwardly from the root are helical continuations of the flanks of the thread on the tip. It is as if the root of the thread were filled in. In a machined bolt, on the other hand, the run-out is made by withdrawing the thread cutting or grinding tool away from the axis of the bolt. This results in the thread crest becoming broader as the root gets narrower, and the flanks of the thread in the run-out are not helical continuations of the thread on the tip. Thus, simply truncating the thread in a run-in in a nut will not produce a structure where the thread run-in can properly engage the thread run-out. In fact, such a nut would jam on a machined bolt.

The locus of the maximum grip plane is defined herein and in typical aerospace specifications by the thickness of the maximum dimension parts the bolt is designed to connect. At least one user specification for aerospace bolts considers the "maximum grip" to be the end of the cylindrical portion of the shank. If such a definition were adhered to, the length of the run-out where a convex lead-in is used, would appear longer than 1.4P to 2.3P by the permissible length of the lead-in (typically 0.5P). However, such a specification also shortens the distance between the bolt head and the "maximum grip" by (typically) 0.5P. The point is, by either definition the complete thread starts at the same distance from the bolt The preferred embodiment of bolt has a convex lead-in at the end of the cylindrical shank. It will be recognized that this is not essential to practice of this invention and the shank may extend as a cylinder to the maximum grip plane, or a diagonal chamfer may be formed. Likewise, the shank may have a larger diameter than described and the run-out may not blend smoothly into the shank as illustrated, but instead the bolt may have an almost step-like increase in diameter at the larger diameter end of the run-out.

The run-out zone on the bolt and the run-in zone in the nut have been described as following circular arcs with selected radii. It will be apparent that some non-circular concave or convex curves, respectively, may be equivalent in providing the sin the scope of the appended claims, this invention may be practiced otherwise than as specifically described.

What is claimed is:
1. A threaded fastener comprising:
a head;
a cylindrical shank;
a tip having a roll formed thread with a uniform pitch P, the thread having a crest at a major diameter which is less than the shank diameter, and a root at a minor diameter, the major diameter lying in a range between a maximum material major diameter when the crest of the thread is at a maximum diameter within tolerances and a minimum material major diameter when the crest of the thread is at a minimum diameter within tolerances, the minor diameter lying in a range between a maximum material minor diameter when the root of the thread is at a maximum diameter within tolerances and a minimum material minor diameter when the root of the thread is at a minimum diameter within tolerances, a pitch diameter lying within a range between a maximum material pitch diameter when the material in the tip of the bolt is at a maximum volume within tolerances and a minimum material pitch diameter when the material in the tip of the bolt is at a minimum volume within tolerances;

a maximum grip plane between the shank and tip a specified distance from the head corresponding to the maximum thickness of parts to be held by the fastener, the flank of the thread being complete at all distances greater than 2P from the maximum grip plane and the thread crest being complete at all distances greater than 1P form the maximum grip plane;

an arcuate lead-in tangent to the shank diameter on the side of the maximum grip plane between the maximum grip plane and the head and extending toward the tip to a diameter at least smaller than the maximum material major diameter of the thread, the lead-in lying in a range between a maximum material lead-in when the material in the bolt is at a maximum volume within tolerances and a minimum material lead-in when the material in the bolt is at a minimum volume within tolerances; and a run-out zone between the maximum grip plane and the tip having a length int he range of form 1.4Ptp 2.3P, the run-out zone having a roll formed thread, the thread root in the run-out zone being tangent to the minor diameter at one end and enlarging toward the maximum grip plane along a continuous curve within an envelope which is defined in a longitudinal cross section of the bolt by:

the minimum material minor diameter at distances greater than 1.4P from the maximum grip plane;

an inner arc with a radius of 2P and tangent to the minimum material minor diameter at 1.4P form the maximum grip plane and extending outwardly until at a diameter at least greater than the minimum material pitch diameter of the thread;

a smooth transition between the inner arc and the minimum material lead-in between the maximum material pitch diameter and the minimum material major diameter;

an outer arc with a radius of 2P and tangent to the maximum material minor diameter at 1.8P form the maximum grip plane and extending outwardly to a diameter at least larger than the minimum material major diameter;

a nut clearance arc with a radius of 5P and tangent to the maximum material minor diameter at a distance of 2.3P form the maximum grip plane extending from 2.3P form the maximum grip plane, to an intersection with the outer arc; and a smooth transition between the outer arc and the maximum material lead-in between the minimum material major diameter and the maximum material major diameter; plus a root radius tangent to the outer arc or nut clearance arc at one end and tangent to the flank of the thread at the other end and having a radius of curvature of not less than the radius of curvature of the thread root in the fully formed thread.

2. A threaded fastener as recited in claim 1 wherein the length of the run-out is no more than 1.8P.

3. A threaded fastener as recited in claim 1 wherein the length of the run-out is in the range of from 1.6P to 2P.

4. A threaded fastener, the thread on the fastener having a crest at a major diameter, a root at a minor diameter and flanks between the crest and the root, the major diameter lying in a range between a maximum material major diameter when the crest of the thread is at a maximum diameter within tolerances and a minimum material major diameter when the crest of the thread is at a minimum diameter within tolerances, the minor diameter lying in a range between a maximum material minor diameter when the root of the thread is at a maximum diameter within tolerances and a minimum material minor diameter when the root of the thread is at a minimum diameter within tolerances, a pitch diameter lying within a range between a maximum material pitch diameter when the material in the tip of the bolt is at a maximum volume within tolerances and a minimum material pitch diameter when the material in the tip of the bolt is at a minimum volume within tolerances, comprising:

a head;

a cylindrical shank;

a tip having a roll formed thread with a uniform pitch P, a major diameter at the thread crest which si less than the shank diameter, and a minor diameter at the thread root;

a maximum grip plane between the shank and tip a specified distance from the head corresponding to the maximum thickness of parts to be held by the fastener, the leading side of the thread being complete at all distances greater than 2P form the maximum grip plane and the thread crest being complete at all distances greater than 1P from the maximum grip plane;

an arcuate lead-in tangent to the shank diameter on the side of the maximum grip plane between the maximum grip plane and the head and extending toward the tip to a diameter at least smaller than the maximum material major diameter of the thread, the lead-in lying in a range between a maximum material lead-in when the material in the bolt is at a maximum volume within tolerances and a minimum material lead-in when the material in the bolt is at a minimum volume within tolerances; and a run-out zone between the maximum grip plane and the tip having a length of no more than 1.8P, the run-out zone having a roll formed thread, the thread root in the run-out zone being tangent to the minor diameter at one end and enlarging toward the maximum grip plane along a continuous curve within an envelope which is defined in a longitudinal cross section of the bolt by:

the minimum material minor diameter at distances greater than 1.4P form the maximum grip plane;

an inner arc with a radius of 2P and tangent to the minimum material minor diameter at 1.4P from the maximum grip plane and extending outwardly until at a diameter at least greater than the minimum material pitch diameter of the thread;

a smooth transition between the inner arc and the minimum material lead-in between the maximum material pitch diameter and the minimum material major diameter;

an outer arc with a radius of 2P and tangent to the maximum material minor diameter at 1.8P from the maximum grip plane and extending outwardly to a diameter at least larger than the minimum material major diameter;

a nut clearance arc with a radius of 5P and tangent to the maximum material minor diameter at a distance of 2.3P form the maximum grip plane, extending from 2.3P from the maximum grip plane to an intersection with the outer arc; and a smooth transition between the outer arc and the maximum material lead-in between the minimum material major diameter and the maximum material major diameter; plus a root radius tangent to the outer arc or nut clearance arc at one end and tangent to the flank of the thread at the other end and having a radius of curvature of not less than the radius of curvature of the thread root in the fully formed thread; and wherein at least a portion of the thread root follows a concave curve having a radius in the range of from 2P to 2.7P.

5. A threaded fastener as recited in claim 4 wherein the continuous concave curve extends to at least the minimum material major diameter.

6. A threaded fastener as recited in claim 4 comprising a convex lead-in between the shank diameter and the concave curve between the pitch diameter and the maximum material major diameter.

7. A threaded fastener for holding parts in a range between a specified minimum total thickness and a specified maximum total thickness comprising:

a bolt having a head, a cylindrical shank adjacent to the head, a tip having a roll formed thread with a uniform pitch P, the thread on the fastener having a crest at a major diameter, a root at a minor diameter and flanks between the crest and the root, the major diameter lying in a range between a maximum material major diameter when the crest of the thread is at a maximum diameter within tolerances and a minimum material major diameter when the crest of ht thread is at a minimum diameter within tolerances, the minor diameter lying in a range between a maximum material minor diameter when the root of the thread is at a maximum diameter within tolerances and a minimum material minor diameter when the root of the thread is at a minimum diameter within tolerances, a pitch diameter lying within a range between a maximum material pitch diameter when the material in the tip of the bolt is at a maximum volume within tolerances and a minimum material pitch diameter when the material in the tip of the bolt is at a minimum volume within tolerances, a maximum grip plane defined between the shank and tip a specified distance from the head corresponding to the maximum thickness of parts to be held by the fastener, and a run-out zone between the shank and the tip having a length in the range of from 1.4P to 2.3P, the run-out zone having a roll formed thread with the thread root being tangent to a minor diameter at the root of the thread on the tip at one end and gradually enlarging toward the shank diameter at the other end along a smooth S-shaped curve within an envelope which is defined in a longitudinal cross section of the bolt by:

the minimum material minor diameter at distances greater than 1.4P form the maximum grip plane;

an inner arc with a radius of 2P and tangent to the minimum material minor diameter at 1.4P form the maximum grip plane and extending outwardly until at a diameter at least greater than the minimum material pitch diameter of the thread;

a smooth transition between the inner arc and the minimum material lead-in between the maximum material pitch diameter and the minimum material major diameter;

an outer arc with a radius of 2P and tangent to the maximum material minor diameter at 1.8P from the maximum grip plane and extending outwardly to a diameter at least larger than the minimum material major diameter;

a nut clearance arc with a radius of 5P and tangent to the maximum material minor diameter at a distance of 2.3P from the maximum grip plane, extending from 2.3P from the maximum grip plane to an intersection with the outer arc; and a smooth transition between the outer arc and the maximum material plead-in between the minimum material major diameter and the maximum material major diameter; plus a root radius tangent to the outer arc or nut clearance arc at one end and tangent to the flank of the thread at the other end and having a radius of curvature of not less than the radius of curvature of the thread root in the fully formed thread; and a nut having a hole with a thread of uniform pitch P, a counterbore in the end of the nut nearer the head of the bolt with an inside diameter larger than the diameter of the shank, and a run-in truncating the crest of the nut thread along a gradually decreasing diameter, the length of the run-in being sufficient that when the nut is threaded onto the bolt to a minimum grip position corresponding to the minimum thickness of parts to be held by the fastener the run-in is at least as long as the length of the run-out zone from the maximum grip plane, so that the run-in in the nut overlaps at least a portion of the run-out on the bolt and the truncated portion of the nut thread clears the bolt thread root in the run-out.

8. A threaded fastener as recited in claim 7 wherein the run-out zone on the bolt extends a distance in the range of from 1.6P to 1.8P from the maximum grip plane.

9. A threaded fastener as recited in claim 8 wherein the run-in in the nut extends a distance of at least 1.8P from the maximum grip plane when then nut is threaded on the bolt to a minimum grip positioned corresponding to the minimum thickness of parts to be held by the fastener.

10. A threaded fastener as recited in claim 9 wherein the length of the counterbore is less than 1/16 inch plus 0.5P.

11. A threaded fastener as recited in claim 11 comprising a convex lead-in on the bolt tangent to the cylindrical shank and extending into the run-out zone adjacent to the maximum grip plane.

12. A threaded fastener as recited in claim 7 wherein the run-in in the nut extends a distance of at least 1.8P form the maximum grip plane when the nut is threaded on the bolt to a minimum grip position corresponding to the minimum thickness of parts to be held by the fastener.

13. A threaded fastener as recited in claim 7 wherein the run-in in the nut extends a distance in the range of at least 2.3P form the maximum grip plane when the nut is threaded on the bolt to a minimum grip position corresponding to the minimum thickness of parts to be held by the fastener.

14. A threaded fastener as recited in claim 13 wherein the concave curve on the bolt has a radius in the range of from 2P to 2.7P and the convex curve in the nut has a radius not more than the radius of the concave curve.

15. A threaded fastener as recited in claim 7 wherein the length of the counterbore is approximately 1/16 inch.

16. A threaded fastener for holding parts in a range between a specified minimum total thickness and a specified maximum total thickness comprising:
a bolt including:
a head,
a cylindrical shank adjacent to the head,
a tip having a roll formed thread with a uniform pitch P, a major thread diameter at the crest of the thread, and a minor thread diameter at the root of the thread, the major diameter lying in a range between a maximum material major diameter when the crest of the thread is at a maximum diameter within tolerances and a minimum material major diameter when the crest of the thread is at a minimum diameter within tolerances, the minor diameter lying in a range between a maximum material minor diameter when the root of the thread is at a maximum diameter within tolerances and a minimum material minor diameter when the root of the thread is at a minimum diameter within tolerances, a pitch diameter lying within a range between a maximum material pitch diameter when the material in the tip of the bolt is at a maximum volume within tolerances and a minimum material pitch diameter when the material in the tip of the bolt is at a minimum volume within tolerances,
a maximum grip plane between the shank and tip a specified distance from the head corresponding to the maximum thickness of parts to be held by the fastener,
a convex lead-in between the shank and threaded tip, the lead-in lying in a range between a maximum material lead-in when the material in the bolt is at a maximum volume within tolerances and a minimum material lead-in when the material in the bolt is at a minimum volume within tolerances, and
a run-out between the shank and the tip, the run-out having a roll formed thread with the thread root in the run-out zone being tangent to the minor diameter at one end and enlarging toward the maximum grip plane along a continuous curve within an envelope which is defined in a longitudinal cross section of the bolt by:
the minimum material minor diameter at distances greater than 1.4P from the maximum grip plane;
an inner arc with a radius of 2P and tangent to the minimum material minor diameter at 1.4P from the maximum grip plane and extending outwardly until at a diameter at least greater than the minimum material pitch diameter of the thread;
a smooth transition between the inner arc and the minimum material lead-in between the maximum material pitch diameter and the minimum material major diameter;
an outer arc with a radius of 2P and tangent to the maximum material minor diameter at 1.8P from the maximum grip plane and extending outwardly to a diameter at least larger than the minimum material major diameter;
a nut clearance arc with a radius of 5P and tangent to the maximum material minor diameter at a distance of 2.3P from the maximum grip plane, extending from 2.3P form the maximum grip plane to an intersection with the outer arc; and
a smooth transition between the outer arc and the maximum material lead-in between the minimum material major diameter and the maximum material major diameter; plus
a root radius tangent to the outer arc or nut clearance arc at one end and tangent to the flank of the thread at the other end and having a radius of curvature of not less than the radius of curvature of the thread root in the fully formed thread; and
a nut including:
a hole with a thread of uniform pitch P matching the thread on the bolt, and
a run-in truncating the crest of the thread at one end of the nut; and wherein
the thread in the bolt run-out has a sufficient portion with the thread major diameter at least equal to the minimum material major thread diameter on the tip, and the crest of the thread in the nut is sufficiently truncated to clear the thread root in the run-out when the nut is threaded onto the bolt to a minimum grip portion corresponding to the minimum thickness of parts to be held by the fastener, so that at least a portion of the thread in the nut run-in is in load bearing engagement with thread in the bolt run-out without interference between the thread crest on the nut and thread root on bolt.

17. A threaded fastener assembly comprising: a bolt including:
a head,
a cylindrical shank adjacent to the head,
a tip having a roll formed thread with a uniform pitch P, a major thread diameter at the crest of the thread, and a minor thread diameter at the root of the thread, the major diameter lying in a range between a maximum material major diameter when the crest of the thread is at a maximum diameter within tolerances the minor diameter lying in a range between a maximum material minor diameter when the root of the thread is at a maximum diameter within tolerances and a minimum material minor diameter when the root of the thread is at a minimum diameter within tolerances, a pitch diameter lying within a range between a maximum material pitch diameter when the material in the tip of the bolt is at a maximum volume within tolerances and a minimum material pitch diameter when the material in the tip of the bolt is at a minimum volume within tolerances.
a maximum grip plane between the shank and tip a specified distance form the head corresponding to the maximum thickness of parts to be held by the fastener,
a convex lead-in between the shank and threaded tip, the lead-in lying in a range between a maximum material lead-in when the material in the bolt is at a maximum volume within tolerances and a minimum material lead-in when the material in the bolt is at a minimum volume within tolerances, and a run-out between the shank and the tip, the run-out having a roll formed thread with the thread root in the run-out zone being tangent to the minor diameter at one end and enlarging toward the maximum grip plane along a continuous curve within an envelope which is defined in a longitudinal cross section of the bolt by:

the minimum material minor diameter at distances greater than 1.4P from the maximum grip plane;

an inner arc with a radius of 2P and tangent to the minimum material minor diameter at 1.4P from the maximum grip plane and extending outwardly until at a diameter at least greater than the minimum material pitch diameter of the thread;

a smooth transition between the inner arc and the minimum material lead-in between the maximum material pitch diameter and the minimum material major diameter;

an outer arc with a radius of 2P and tangent to the maximum material minor diameter at 1.8P from the maximum grip plane and extending outwardly to a diameter at least larger than the minimum material major diameter;

a nut clearance arc with a radius of 5P and tangent to the maximum material minor diameter at a distance of 2.3P form the maximum grip plane, extending from 2.3P from the maximum grip plane to an intersection with the outer arc; and a smooth transition between the outer arc and the maximum material lead-in between the minimum material major diameter and the maximum material major diameter; plus a root radius tangent to the outer arc or nut clearance arc at one end and tangent to the flank of the thread at the other end and having a radius of curvature of not less than the radius of curvature of the thread root in the fully formed thread; and a hollow collar of softer material than the bolt and swaged onto the bolt so that the wall of the hole through the collar engages the thread-on the bolt.

* * * * *

UNITED STATES PATENT AND TRADEMARK OFFICE
CERTIFICATE OF CORRECTION

PATENT NO. : 5,039,265

DATED : August 13, 1991

INVENTOR(S) : Jack Rath; Roland A. Wheeler

It is certified that error appears in the above-identified patent and that said Letters Patent is hereby corrected as shown below:

On the title page:

[56] References Cited, insert the following:

```
--       FOREIGN PATENT DOCUMENTS
2088508    6/1982    Great Britain.....411/366
 685703    1/1953    Great Britain.....411/366
 843952    7/1952    Germany...........411/411
5313496   10/1978    Japan.............411/366 --
```

Column 7, line 43, after "from" insert -- the end of the shank or maximum grip plane 18, the bolt --.

Column 10, line 28, change "leadin" to -- lead-in --.

Column 10, line 32, after "root" insert -- radius $R_R$ in the concave transition is tangent to the --.

Column 18, line 38, after "bolt" insert -- head. --.

Column 18, line 53, after "providing the" delete "sin" and insert
-- same result.
   Since variations of this sort are within the skill of this art, it will be understood that within --

UNITED STATES PATENT AND TRADEMARK OFFICE
CERTIFICATE OF CORRECTION

PATENT NO.  : 5,039,265

DATED       : August 13, 1991

INVENTOR(S) : Jack Rath; Roland A. Wheeler

It is certified that error appears in the above-identified patent and that said Letters Patent is hereby corrected as shown below:

Column 18, line 57, after "fastener" insert
    -- assembly --.

Column 19, line 18, change "form" to -- from --.
Column 19, line 31, change "int he" to -- in the --.
Column 19, line 31, change "1.4Ptp" to -- 1.4P to --.
Column 19, lines 41,51,57,58, change "form" to -- from --
    (all occurrences).

Column 20, line 28, after "which" change "si"
    to -- is --.
Column 21, line 44, after "of" change "ht" to -- the --.

Column 22, line 53, after "when" change "then"
    to -- the --.
Column 22, 61, change "claim 11" to -- claim 7 --.
Column 22, line 67, change "form" to -- from --.

Column 23, line 5, change "form" to -- from --.

Column 24, line 13, change "form" to -- from --.
Column 24, line 41, after "comprising:" start a new
    paragraph with "a bolt including:".
Column 24, line 51, after "tolerances" insert
    -- and a minimum material major diameter when the
    crest of the thread is at a minimum diameter
    within tolerances, --.
Column 24, line 61, after "tolerances" delete the period and
    insert a comma.

UNITED STATES PATENT AND TRADEMARK OFFICE
CERTIFICATE OF CORRECTION

PATENT NO. : 5,039,265
DATED      : August 13, 1991
INVENTOR(S) : Jack Rath; Roland A. Wheeler It is certified that error appears in the above-identified patent and that said Letters Patent is hereby corrected as shown below:

Column 24, line 64, change "form" to -- from --.

Column 26, line 8, change "form" to -- from --.
Column 26, line 22, change "thread-on" to
         -- thread on --.

Signed and Sealed this

Eighth Day of June, 1993

Attest:

MICHAEL K. KIRK

Attesting Officer    Acting Commissioner of Patents and Trademarks